United States Patent [19]
Youvan et al.

[11] Patent Number: 5,852,498
[45] Date of Patent: *Dec. 22, 1998

[54] OPTICAL INSTRUMENT HAVING A VARIABLE OPTICAL FILTER

[75] Inventors: Douglas C. Youvan; Mary M. Yang, both of San Jose, Calif.

[73] Assignee: KAIROS Scientific Inc., Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 833,351

[22] Filed: Apr. 4, 1997

[51] Int. Cl.⁶ .................................................. G01N 21/64
[52] U.S. Cl. .......................... 356/417; 250/458.1; 356/73
[58] Field of Search ...................... 356/317, 318, 356/417, 73; 250/458.1, 469.1, 461.1, 461.2

[56] References Cited

U.S. PATENT DOCUMENTS

| | | | |
|---|---|---|---|
| 3,754,823 | 8/1973 | Weisglass et al. | 355/35 |
| 3,796,826 | 3/1974 | Kerr | 178/7.2 |
| 3,864,037 | 2/1975 | Johnson | 356/74 |
| 3,963,350 | 6/1976 | Watanabe et al. | 356/39 |
| 4,122,348 | 10/1978 | Bruck | 250/461 |
| 4,394,069 | 7/1983 | Kaye | 350/347 |
| 4,632,554 | 12/1986 | Pearce | 356/349 |
| 4,744,667 | 5/1988 | Fay et al. | 356/417 |
| 4,920,386 | 4/1990 | Tsuchiya et al. | 356/417 |
| 4,991,970 | 2/1991 | Darboux et al. | 356/402 |
| 5,106,387 | 4/1992 | Kittrell et al. | 606/15 |
| 5,125,404 | 6/1992 | Kittrell et al. | 128/634 |
| 5,189,532 | 2/1993 | Ramsbottom et al. | 359/15 |
| 5,199,431 | 4/1993 | Kittrell et al. | 128/634 |
| 5,304,173 | 4/1994 | Kittrell et al. | 606/15 |
| 5,318,024 | 6/1994 | Kittrell et al. | 128/634 |
| 5,333,052 | 7/1994 | Finarov | 250/458.1 |
| 5,381,016 | 1/1995 | Moriya | 250/458.1 |
| 5,402,234 | 3/1995 | Deck | 356/357 |
| 5,412,473 | 5/1995 | Rosencwaig et al. | 356/351 |
| 5,420,717 | 5/1995 | Tabata | 359/371 |
| 5,521,705 | 5/1996 | Oldenbourg et al. | 356/368 |

OTHER PUBLICATIONS

Ackleson, S.G., et al. "Ocean Optics: The Seasonal Time Scale II," *EOS* (abstract) 71:108 (1990).

Aiken, J., et al. "The SeaWiFS CZCS–Type Pigment Algorithm," *NASA Technical Memorandum 104566*, 29:1–37 (1995).

Boyer, M., et al. "Senescence And Spectral Reflectance In Leaves of Northern Pin Oak (*Quercus Paulstris Muenchh.*)," *Remote Sensing of Environment*, 25(1):71–87 (1988).

(List continued on next page.)

*Primary Examiner*—F. L. Evans
*Attorney, Agent, or Firm*—Fish & Richardson P.C.

[57] ABSTRACT

An optical instrument for use in collecting light from an object, the optical instrument having a post-objective waist with a variable optical filter positioned approximately at the post-objective waist. The invention also comprises an optical instrument for collecting light from an object, comprising an objective lens positioned to receive light from the object, an exit lens positioned to focus the light at a focal position, and a variable optical filter positioned between the objective lens and the focal position approximately at a waist of the light. The optical instrument may be an epifluorescence microscope for use in observing an image formed from light from an object under illumination by a light source. The light source may be, for example, a filtered light source or a monochromatic light source, preferably in an epifluorescence configuration. The variable optical filter may be a circular variable interference filter or a tilting interference filter. In some embodiments, the orientation of the filter may be varied to block light outside of one band at one time and outside of another band at another time. The variable filter preferably is band pass, blocking substantially all light at wavelengths other than a selected wavelength band.

20 Claims, 2 Drawing Sheets

OTHER PUBLICATIONS

Curran, Paul J., et al. "Reflectance Spectroscopy of Fresh Whole Leaves For the Estimation Of Chemical Concentration," *Remote Sensing of Environment*, 39(2):153–166 (1992).

Curran, Paul J., et al. "Remote Sensing of Foliar Chemistry," *Remote Sensing of Environment*, 30(3):271–278 (1989).

Curran, Paul J., et al. The Effect of A Red Leaf Pigment On The Relationship Between Ted Edge And Chlorophyll Concentration, *Remote Sensing of Environment*, 35(1):69–76 (1992).

Danson, F.M., et al. "Red–Edge Response To Forest Leaf Area Index," *International Journal Of Remote Sensing*, 16(1):193–188 (1995).

Holligan, P.M., et al. "Satellite And Ship Studies Of Coccolithophore Productiion Along A Continential Shelf Edge," *Nature International Weekly Journal of Science*, 304:339–342 (1983).

Millie, D.F., et al. "High–Resolution Airborne Remote Sensing Of Bloom–Forming Phytophankton," *Journal of Phycology*, 28:281–290 (1992).

Weaver, E.C., et al. "Factors Affecting The Identification Of Phytoplankton Groups By Means Of Remote Sensing," *NASA Technical Memorandum 108799*, pp. 1–121 (1994).

Yang, M.M., "Applications Of Imaging Spectroscopy In Molecular Biology: I. Screening Phynthetic Bacteria," *Biotechnology* 6:939–942 (1988).

Yang, M.M., "Digital Imaging Spectroscopy of Microbial Colonies," *American Biotechnology Laboratory*, May 18–20, 1994.

Yang, M.M., "Raman Spectroscopic Investigations of Hydrothermal Solutions," *Doctoral Thesis* (abstract), Princeton University (1987).

Youvan, D.C., "Imaging Sequence Space," *Nature International Weekly Journal of Science*, 369:79–80 (1994).

E.S. Rich, et al., "A Flexible, Computer Controlled Video Microscope Capable of Quantitative Spatial, Temporal and Spectral Measurements," *Clinical Chemistry*, vol. 27, No. 9, pp. 1558–1568, 1981.

D.C. Youvan, et al., "Fluorescence Imaging Micro–Spectrophotometer (FIMS)," *Biotechnology et alia*, vol. 1, pp. 1–16, Contributed Jun. 5, 1997.

D.C. Youvan, et al., "Calibration of Fluorescence Resonance Energy Transfer in Microscopy Using Genetically Engineered GFP Derivatives on Nickel Chelating Beads," *Biotechnology et alia*, vol. 3, pp. 1–18, Received Sep. 5, 1997.

OPTICAL INSTRUMENT HAVING A VARIABLE OPTICAL FILTER

STATEMENT AS TO FEDERALLY SPONSORED RESEARCH

The U.S. Government has certain rights in this invention pursuant to Grant No. 1R43GM55085 awarded by the National Institutes of Health.

BACKGROUND OF THE INVENTION

1. Field of the Invention

This invention relates to optical instruments for observing an image of an object.

2. Description of Related Art

Imaging spectroscopy allows a user to observe and record the spectral characteristics of an illuminated object throughout the spatial extent of the object. Observing optical characteristics of an object across a wide range of wavelengths allows the user to glean information about the object, including in many cases its material composition.

For example, fluorescent excitation characteristics are derived by illuminating an object at several wavelengths and, for each of these wavelengths, observing the object's fluorescent emission at a specified emission wavelength. Fluorescent emission characteristics are derived by illuminating the object at a selected excitation wavelength and observing the wavelengths at which the object fluoresces in response to the illumination. Reflection, absorption, and other spectral characteristics are derived with similar techniques, in known fashion.

A conventional imaging spectroscope typically includes an optical cube consisting of an excitation filter, an emission filter, and a dichroic mirror. The excitation filter is a band pass or high pass filter that allows only short wavelength light from a light source to pass through. The emission filter is a band pass or low pass filter that passes only long wavelength light emitted by the object in response to illumination by the shorter wavelength exciting light. The dichroic mirror is a beam splitter that reflects the exciting light onto the object and then allows emitted light from the object to pass through. The "cut on" wavelength of the dichroic mirror generally lies between the transmission bands of the excitation and emission filters in a simple configuration.

Instead of optical cubes, some spectroscopes employ variable optical filters to acquire optical spectra. The band pass characteristics of a variable filter may be changed by altering the physical orientation or optical characteristics of the filter. For example, U.S. Pat. No. 3,864,037 to Johnson, incorporated in this application by reference, describes an imaging spectroscope having a variable filter placed among the elements of the instrument's objective lens. U.S. Pat. No. 3,963,350 to Watanabe, incorporated in this application by reference, describes an optical instrument for imaging blood samples where a source light passes through a variable filter before illuminating the blood sample.

SUMMARY OF THE INVENTION

The invention comprises an optical instrument for use in collecting light from an object, the optical instrument having a post-objective waist with a variable optical filter positioned approximately at the post-objective waist. The invention also comprises an optical instrument for collecting light from an object, comprising an objective lens positioned to receive light from the object, an exit lens positioned to focus the light at a focal position, and a variable optical filter positioned between the objective lens and the focal position approximately at a waist of the light.

The optical instrument may be an epifluorescence microscope for use in observing an image formed from light from an object under illumination by a light source. The light source may be, for example, a filtered light source or a monochromatic light source, preferably in an epifluorescence configuration. The variable optical filter may be a circular variable interference filter or a tilting interference filter. In some embodiments, the orientation of the filter may be varied (e.g., by a mechanism such as a stepping motor) to block light outside of one band at one time and outside of another band at another time. The variable filter preferably is band pass, blocking substantially all light at wavelengths other than a selected wavelength band.

In some embodiments, the optical instrument includes a recorder, such as a CCD camera, placed at the focal position to record an image of the light from the object. The recorder also may be connected to a computer system, which may store and process the recorded images.

Advantages of the invention may include one or more of the following:

At a waist of the instrument, the area of the light passing through the variable filter is very small, so the light spans only a small portion of the filter, improving out-of-band filter leakage with less likelihood of image distortion;

The waist of the light is readily accessible, permitting existing instruments to be modified in conformance with the invention.

The details of one or more embodiments of the invention are set forth in the accompanying drawings and the description below.

BRIEF DESCRIPTION OF THE DRAWINGS

Like reference numbers and designations in the various drawings indicate like elements.

DETAILED DESCRIPTION OF THE INVENTION

Overview

For purposes of illustration only, the invention will be described in the context of an epifluorescence microscope. However, while the invention is well suited for use with an epifluorescence microscope, it also may be used in other optical instruments, such as telescopes, in which only certain wavelengths of light are to be observed and/or recorded, or in non-focusing applications, in which only certain wavelengths of light are to be collected but without regard to forming an image.

Fluorescence microscopy is based on the same principles of optics as light microscopy. To create an image in a light microscope, light waves from an illumination source pass through and around an object or specimen. Those light waves are gathered and then recombined by the objective lens system of the microscope to form the image of the object. In the case of epifluorescence microscopy, a single lens serves as both the condenser (the lens system that focuses the light before it reaches the specimen) and the objective. Selected wavelengths of light pass through the lens and excite fluorescent molecules (e.g., from a staining dye) in an object. The excited molecules re-emit light at a longer wavelength (a different color). Some of that light is collected by the objective lens and then optically coupled to a detection system to produce a fluorescent image.

Achieving a fluorescence image is optically demanding, because the low-energy light emitted from a fluorescing object is generally not as intense as the high-energy wavelengths initially used to excite the fluorescent molecules. Accordingly, the optical system of a fluorescence microscope incorporates one or more filters that fine-tune the light going to and coming from an object. The present invention provides a novel configuration for a variable filter system in such an optical instrument.

Exemplary Microscope

Figure 1:
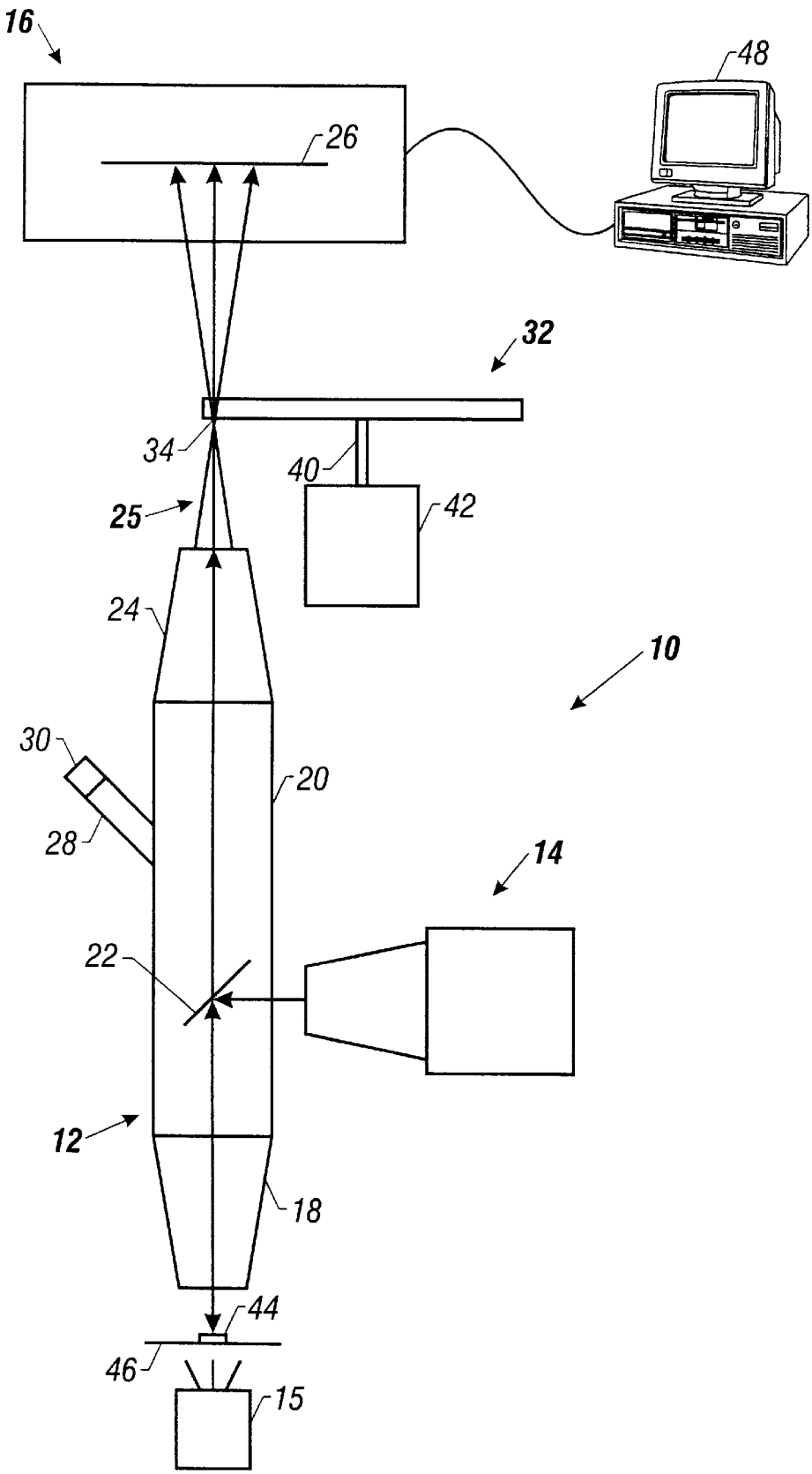
FIG. 1 is a schematic diagram of an optical instrument, such as an epifluorescence microscope, having a variable optical filter placed at a light waist in the instrument.

Referring to FIG. 1, an imaging spectroscope 10 utilizing the present invention combines the spatial resolution of a conventional epifluorescence microscope (less than about one micron) with the spectral resolution of a conventional fluorimeter (less than about 2 nm). The illustrated spectroscope 10 includes a microscope 12 combined with an epifluorescence light source 14 and an image recorder 16, such as a CCD imaging camera. The microscope 12 includes an objective lens 18 in the light path 25 from an object 44. Within the body 20 of the microscope 12, a dichroic mirror 22 directs light in a first band of wavelengths from the epifluorescence light source 14 to the object 44 through the objective lens 18, and passes light in a second band of wavelengths from the objective lens 18. A projection eyepiece exit lens 24 focuses the light in the light path 25 at a focal position 26. However, in some applications, the exit lens 24 can be a non-imaging optical collector, such as a compound parabolic concentrator having high interior reflectance. As is known in the art, both the objective lens 18 and the exit lens 24 may be complex lens structures.

The microscope 12 also may include an ocular port 28 and an ocular lens 30 that allow a user to view images directly when the image recorder 16 is in place, in known fashion. One suitable instrument that may be adapted for use with the invention is the BX60 epifluorescence microscope available from Olympus America.

In the illustrated embodiment, a CCD array of the CCD camera 16 is placed at the focal position 26 to record images formed from the light in the light path 25. One suitable CCD camera is the K7 CCD camera (16 bit, 760×510 resolution) available from KAIROS Scientific Inc. of Santa Clara, Calif.

An important aspect of the invention is the placement of a variable optical filter 32 approximately at a post-objective optical waist 34 in the light path between the objective lens 18 and the focal position 26. In a complex optical instrument, more than one such waist 34 may exist; in the embodiment shown, one such waist 34 is between the projection exit lens 24 and the focal position 26. The variable filter 32 is positioned directly within the light path 25 approximately at the waist 34. The cross-section of the light path 25 at the narrowest waist 34 approximates a point, and the light in the light path 25 is nearly collimated. For certain types of filters (e.g., a circular variable interference filter), broader band pass characteristics (i.e., more light and less spectral differentiation) can be obtained by moving the variable filter 32 slightly off the narrowest waist 34 along the z-axis. However, the cross-sectional area of the light should extend over only the narrowest filter band of a particular variable filter 32; typically this range is within about ±5 millimeters from the narrowest waist 34 along the light path 25.

To reduce glare and reflections, the variable filter 32 preferably is tilted slightly (about 5 degrees) with respect to the z-axis of the microscope 12. The exact angle does not seem to be critical and is a matter of design choice.

In the illustrated embodiment, the variable filter 32 connects to the axle 40 of a stepper motor 42, which is used to rotate the filter and thus vary its filtering characteristics, as described in more detail below. However, other mechanisms may be used to vary any particular type of variable filter 32. Preferably, any such mechanism is suitable for automated control.

The epifluorescence light source 14 may be a laser, a monochromator with a xenon arc lamp, or any other suitable source with suitable filtering. A variable wavelength source has a number of advantages. By replacing the fixed wavelength excitation and emission filters of a conventional epifluorescence microscope with fully tunable wavelength selection, the invention enables simultaneous determination of the fluorescence spectrum of every pixel in a scene.

Operation

The illustrated image spectroscope 10 may be used to observe and record the absorption, fluorescent excitation, and fluorescent emission characteristics of an object 44, such as a bacterial sample or a plant specimen, mounted on a stage 46. The epifluorescence light source 14 generates a selected short wavelength excitation light that is reflected by the dichroic mirror 22 through the objective lens 18 (acting as a condenser) and onto the object 44. If the excitation light causes the object 44 to fluoresce, light emitted by the object 44 travels through the objective lens 18 and encounters the dichroic mirror 22. Thus, the variable filter 32 must be positioned on the post-objective side of the objective lens 18 to properly filter desired wavelengths.

The dichroic mirror 22 preferably is a long-pass filter (i.e., a long wavelength filter), so that only long wavelength light emitted by the object 44 passes through to the exit lens 24. The exit lens 24 then focuses the emitted light onto the CCD array of the CCD camera 16, which records the images contained in the light. The CCD camera 16 may pass the images to a computer system 48 for processing and storage.

For collection of fluorescent information, the dichroic mirror 22 should efficiently reflect (towards the sample object 44) wavelengths shorter than the emission wavelength being observed, and efficiently pass (towards the image recorder 16) wavelengths longer than the excitation wavelength. This "cut-on" wavelength occurs in the region between the fluorescent excitation and emission bands where overlap is minimal. To further optimize the amount of information which can be collected in an emission scan, the cut-on wavelength of the dichroic mirror 22 should be positioned immediately to the red side of the excitation band. For an excitation scan, the cut-on transmission wavelength of the dichroic mirror 22 should be positioned immediately to the blue side of the emission band. The microscope 12 may include multiple dichroic mirrors with different cut-on points, as well as a mechanism to exchange the mirrors automatically. The epifluorescence light source 14 preferably projects light in a direction orthogonal to the axis of transmission of the microscope 12, so the dichroic mirror 22 should be positioned at 45° with respect to the transmission axis of the microscope 12. In the preferred embodiment, the dichroic mirror 22 is mounted in a conventional optical cube from which the conventional excitation and/or emission filter has been removed.

In an excitation scan mode, the excitation wavelength of the light source 14 is varied while images of emissions are recorded through one band of wavelength filtration. Such scans can be repeated for a set of emission filter wavelength bands. In an emission scan mode, the excitation wavelength of the light source 14 is set on one band of wavelength filtration while images of emissions are recorded through a series of filtration band wavelengths. Such scans can be repeated for a set of excitation filter wavelength bands. The computer system 48 is preferably used to control the variance of the excitation wavelength and the emission filtration wavelength.

The spectroscope 10 also may include a second light source 15, such as a white or monochromatic light source, to illuminate the object 44 in a bright field mode. The second light source 15 may also be configured as shown in U.S. Pat. No. 3,963,350 with a variable optical filter. Use of the lower second light source 15 facilitates image processing and imaging spectroscopy for combining bright field and epifluorescence data while using the same type of imaging spectroscope 10 setup shown in FIG. 1.

In an absorption mode, white light from the lower second light source 15 is used to "back light" the sample object 44. Wavelength selection is accomplished by rotation of the variable filter 32, with the dichroic mirror 22 preferably removed. In an alternative embodiment, absorption images may be collected by filtering or tuning the second light source 15 and removing both the dichroic mirror 22 and the variable filter 32, or providing a clear region in the variable filter 32.

Variable Filter

Figure 2A:
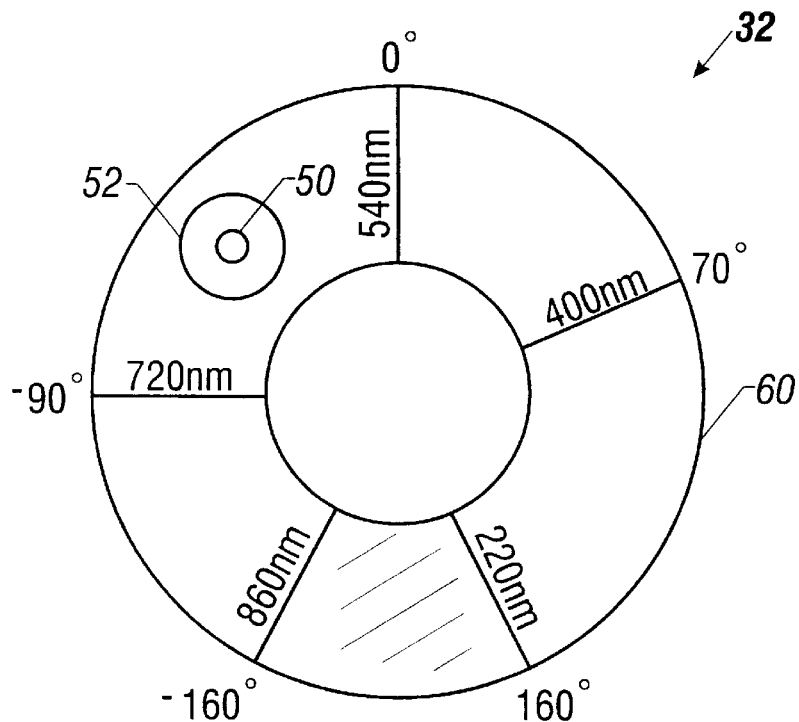
FIGS. 2a and 2b are a front view and a side view, respectively, of variable filters that may be used in the instrument of FIG. 1.
Figure 2B:
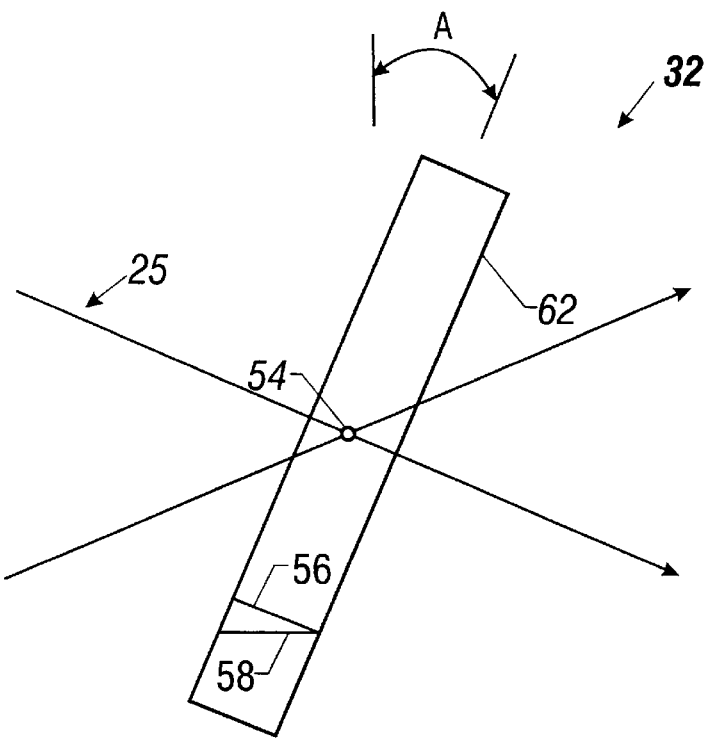

Referring to FIGS. 2a and 2b, the variable filter 32 may be one of several types of filters. FIG. 2a shows a circular variable interference filter (CVIF) 60, or wedge filter, the band pass characteristics of which vary angularly. A typical CVIF is formed from a circular plate of glass, the surface of which is coated with an optical interference film. The thickness of the interference film determines the band pass characteristics of the filter, so the thickness of the film layer in a CVIF varies angularly around the circumference of the filter to give the filter variable band pass characteristics. In a CVIF, the thinnest portion of the film layer is associated with shorter wavelength selection and the thickest portion of the film layer is associated with longer wavelength selection. The preferred filter has a 400–720 nm filtering range.

One advantage of a CVIF filter is that it is manufactured in a continuous process on a single flat glass substrate, and thus exhibits low distortion and accurate matching of all relevant optical parameters. Other advantages of a CVIF filter include the following:

1) Robustness. Compared to alternative technologies, a CVIF is relative insensitive to temperature and light acceptance angles.
2) Excellent image registration. In one prototype of the invention, no spatial translation in the x or y dimensions or warping in some complex manner occurred as the CVIF variable filter 32 was turned. It appears that placement of refractive and dielectric materials approximately at a waist 34 does not cause problems that are known to occur in placement of filters at other positions in the optics of such an instrument.
3) CVIF data are parfocal with the eye. In one prototype of the invention, placing the CVIF variable filter 32 in the optical path of the instrument did not change the focal position 26 for the CCD camera 16. In other words, the optical focus through air (no CVIF variable filter 32) was the same as with the CVIF variable filter 32. Operationally, this means that the exact focus determined by using one's eyes on the ocular lens 30 is exactly what the CCD camera 16 "sees" to be in focus. Thus, it appears that eyes and the CCD camera 16 are parfocal with and without the CVIF at all relevant magnifications. Thus, no "electronic" focusing is needed while observing the image generated by the CCD camera 16.
4) Low cost. A CVIF variable filter 32 is relatively inexpensive and manufacturing specifications are flexible compared to other variable filters.
5) CVIF data is easily calibrated. The percentage transmission (% T) of a CVIF variable filter is rather constant and any changes vary in a slow monotonic manner around the filter. Therefore, there are no sudden "glitches" in % T which would affect throughput and radiometric calibration in an abrupt manner, as is often the case using conventional blocking filters.

The wavelengths of emitted light observed in a typical spectroscopy application vary from 400 nm to 720 nm. However, a greater range of wavelength selection often is desired. In the particular CVIF 60 illustrated in FIG. 2a, the wavelength selection at any given angular position is determined by the equation $\lambda=(540-2\theta)$ nm for angles between $-160°$ and $160°$. Suitable CVIF filters are available from Optical Coating Laboratories, Inc. of Santa Rosa, Calif.

FIG. 2a also illustrates one benefit of placing the CVIF 60 at a waist of the light path 25. Circle 50 represents the cross-section of the light path 25 striking the surface of the variable filter 32 near the waist 34, while circle 52 represents the cross-section further away from the waist 34. Because circle 50 is significantly smaller than circle 52, the light represented by circle 50 encounters a smaller angular percentage of the variable filter 32 than does the light represented by circle 52. Therefore, the band pass characteristics of the variable filter 32 are narrower with respect to circle 50 than they are with respect to circle 52 (i.e., fewer undesired wavelengths leak through the filter for circle 50 than for circle 52). If the cross-section of the light at the surface of the variable filter 32 were reduced to a point (i.e., the narrowest waist), the filter would pass essentially only the narrowest band of wavelengths permitted by the particular filter design.

The periphery of a CVIF 60 has less of a wavelength "ramp" or gradient compared to inner diameters, and thus is the preferred region to be positioned within a waist, since the size of the waist can be larger while maintaining the narrowest band pass. As discussed above, an image spectroscope having a CVIF 60 placed approximately at the narrowest waist can be made to operate with a band pass of less than 2 nm.

While the variable filter 32 is shown as circular, similar technology can be used to create linear or other shaped "wedge" interference filter that can be moved across the waist 34 of an imaging spectroscope 10.

FIG. 2b shows a tilting interference filter 62, which may be used instead of a CVIF in the image spectroscope. The band pass characteristics of the tilting interference filter 62 are varied by tilting, or rotating, the filter about axis 54 to vary the effective thickness of the filter with respect to the incident light. Line 56 represents the thickness of the filter 62 with respect to the center of the light path 25 when the filter 62 is fully upright. Line 58 represents the thickness of the filter with respect to the center of the light path 25 when filter 62 is tilted to angle A. Because line 58 forms the hypotenuse of a right triangle for which line 56 is one of the legs, it is clear that the effective thickness of the filter is greater when the filter is tilted. The use of a tilting interference filter in an image spectroscope is described in detail in U.S. Pat. No. 3,864,037.

Instead of a CVIF or tilting interference filter, the variable filter 32 may be one of any number of variable filter types, including: acousto-optical tunable filters; electropolarization devices, such as liquid crystal tunable filters; glass gradient filters; and multiple independent filter films or glasses arrayed on a linear, circular, or other shaped holder or substrate.

A number of embodiments of the present invention have been described. Nevertheless, it will be understood that various modifications may be made without departing from the spirit and scope of the invention. For example, the variable filter 32 can be band pass, multi-band pass, high pass, or low pass. In various embodiments, the light in the light path 25 may represent spectra of various types, including (but not limited to) reflectance spectra, emission spectra of various types (e.g., chemiluminescence, phosphorescence, and/or fluorescence), light from elastic scattering effects (e.g., Rayleigh or Mie scattering) or inelastic scattering effects (e.g., Raman scattering), and absorption spectra. In addition, the imaging spectroscope can be configured for different modes, such as bright field, dark field, phase contrast, and other known modes. Further, in certain configurations, the light source 14 is not needed (e.g., when obtaining chemiluminescence spectra) or is turned off at times while observing a specimen (e.g., when obtaining phosphorescence spectra). Accordingly, it is to be understood that the invention is not to be limited by the specific illustrated embodiments, but only by the scope of the appended claims.

What is claimed is:

1. An optical instrument for use in collecting light from an object, the optical instrument having a post-objective waist, the instrument including:
    (a) a variable optical filter positioned approximately at the post-objective waist.

2. An optical instrument for collecting light from an object, comprising:
    (a) an objective lens positioned to collect light from the object;
    (b) an exit lens positioned to focus the collected light at a focal position; and
    (c) a variable optical filter positioned between the objective lens and the focal position approximately at a waist in the collected light.

3. The optical instrument of claim 1 or 2, wherein the light consists of fluorescence emissions from the object.

4. The optical instrument of claim 1 or 2, further including at least one light source for illuminating the object.

5. The optical instrument of claim 4, wherein at least one light source comprises an epifluorescence light source.

6. The optical instrument of claim 4, wherein at least one light source comprises an absorption mode light source for back lighting the object.

7. The optical instrument of claim 1 or 2, wherein the variable optical filter comprises a circular variable interference filter.

8. The optical instrument of claim 2, further comprising an image recorder positioned at the focal position to record the light.

9. The optical instrument of claim 8, wherein the image recorder comprises a CCD camera.

10. The optical instrument of claim 1 or 2, wherein the optical instrument comprises a microscope.

11. The optical instrument of claim 10, further including an epifluorescence light source for illuminating the object.

12. The optical instrument of claim 10, further including an absorption mode light source for back lighting the object.

13. A method of collecting light from an object for analysis, the method comprising:
    (a) collecting light from an object using an objective lens;
    (b) focusing the collected light onto a focal position; and
    (c) guiding the collected light through a variable optical filter positioned approximately at a waist of the collected light between the objective lens and the focal position.

14. The method of claim 13 wherein the light comprises fluorescence emissions from the object.

15. The method of claim 13, further including the step of illuminating the object from at least one light source.

16. The method of claim 13, further including the step of illuminating the object with an epifluorescence light source.

17. The method of claim 13, further including the step of back lighting the object with an absorption mode light source.

18. The method of claim 13, wherein the variable optical filter comprises a circular variable interference filter.

19. The method of claim 13, further comprising positioning an image recorder at the focal position to record the light.

20. The method of claim 19, wherein the image recorder comprises a CCD camera.

\* \* \* \* \*